United States Patent [19]

Bauer et al.

[11] Patent Number: 4,487,053
[45] Date of Patent: Dec. 11, 1984

[54] WINDSHIELD WIPER YOKE

[75] Inventors: Kurt Bauer, Ingersheim; Georg Hesch, Sachsenheim; Hans Huber, Bietigheim-Bissingen; Helmut Markert, Pleidelsheim; Christian Roth, Bietigheim-Bissingen, all of Fed. Rep. of Germany

[73] Assignee: ITT Industries, Inc., New York, N.Y.

[21] Appl. No.: 521,011

[22] Filed: Aug. 8, 1983

Related U.S. Application Data

[60] Division of Ser. No. 78,939, Sep. 26, 1977, Pat. No. 4,309,790, and a continuation of Ser. No. 299,728, Sep. 8, 1981, abandoned.

[30] Foreign Application Priority Data

Oct. 4, 1978 [DE] Fed. Rep. of Germany ....... 2843249

[51] Int. Cl.³ .............................................. B21D 53/88
[52] U.S. Cl. ......................................... 72/335; 72/379
[58] Field of Search ................ 72/335, 339, 375, 379, 72/414, 415, 416; 29/163.5 R; 15/250.38, 250.42

[56] References Cited

U.S. PATENT DOCUMENTS

| 2,255,894 | 9/1941 | Ormond | 72/335 |
| 2,334,243 | 11/1943 | Bowers | 29/163.5 R |
| 2,644,352 | 7/1953 | Ressegger | 72/405 |
| 2,937,393 | 5/1960 | Brueder | 15/250.42 |
| 3,673,631 | 7/1972 | Yamadai et al. | 15/250.42 |
| 4,017,936 | 4/1977 | Schweikert | 72/379 |

FOREIGN PATENT DOCUMENTS 493562 3/1930 Fed. Rep. of Germany ..... 29/163.5 R

*Primary Examiner*—Lowell A. Larson
*Attorney, Agent, or Firm*—Donald J. Lenkszus

[57] ABSTRACT

A windshield wiper yoke and a method for producing same is described. The wiper yoke is formed from a single strip of sheet metal which is bent to have a U-shaped cross-section. The web of the yoke includes a plurality of slots each of which extends in width to or beyond the imaginary bending lines. With slots provided in accordance with the invention, the wiper yoke exhibits relatively good aerodynamic behavior at high vehicle speeds.

3 Claims, 6 Drawing Figures

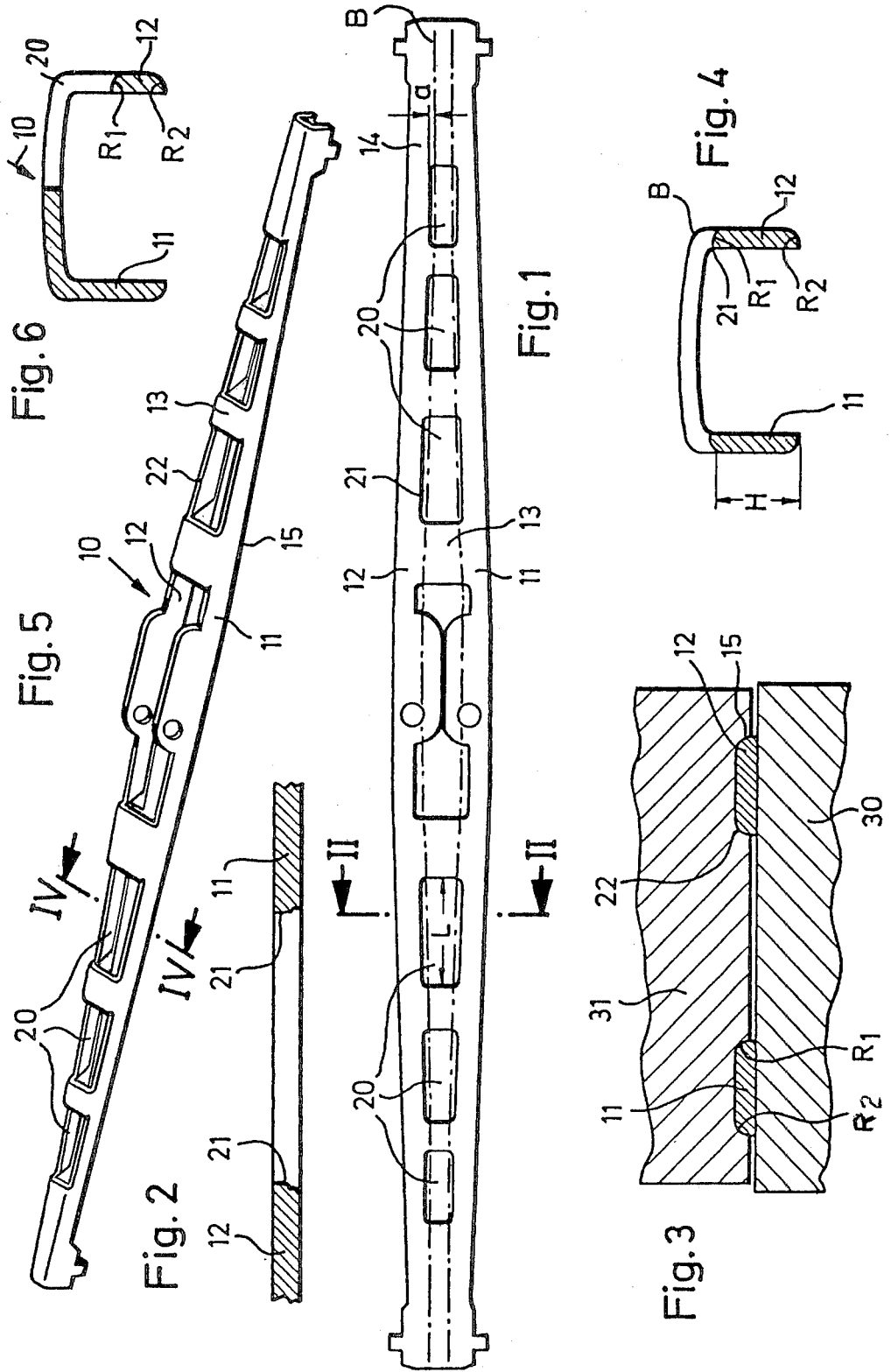

WINDSHIELD WIPER YOKE

This is a division of application Ser. No. 078,939 filed Sept. 26, 1979 now U.S. Pat. No. 4,309,790 granted Jan. 12, 1982 and a continuation of application Ser. No. 299,728, filed Sept. 8, 1981, now abandoned.

BACKGROUND OF THE INVENTION

1. Field of the Invention

This invention relates to windshield wiper assemblies, in general, and to an improved wiper yoke and method of making same, in particular.

2. Description of the Prior Art

In German AS No. 1,075,450, a yoke formed from a sheet metal strip for a wiper blade is provided with oblong slots which improve the aerodynamic behavior of the wiper assembly. One slot is positioned in the main yoke between the articulating point of the wiper arm and the articulating point of the clawed yoke. The width of the slot is a multiple of the thickness of the sheet metal strip and is less than the spacing between the lateral shanks or sidewalls of the yoke. The main yoke and the similarly formed clawed yoke when viewed in cross-section in the area of the slots have two angular profiles to provide sufficient stability. However, because of the narrow width of the slots, this yoke arrangement does not meet requirements for aerodynamic behavior at high driving speeds.

In French Patent No. 2,050,605, a wiper blade assembly similar to that described above is shown wherein the web of one yoke has a central separating line. Flanges lateral to the separating line are bent downwards parallel to the sidewalls of the yoke such that in the area of the slots, the cross-sectional view shows two U-shaped profiles. This yoke is relatively stable, but the aerodynamic behavior is less than desirable, again because the width of the slots is narrow. Additionally, this yoke is not easily fabricated using conventional production fabrication techniques.

Yokes for wiper blades known from German AS Nos. 1,480,094 and 1,243,545 and from French Patent No. 1,448,400 provide slots having a width corresponding to the spacing of the lateral shanks, but the yokes comprise several piece parts. None of these yokes are formed from a single sheet metal strip.

Enormous difficulties have been encountered in producing a yoke formed of a metal sheet strip having wider slots. Proper bending of the strip in the area of the slots to form the sidewalls has not priorly been achieved when the spacing between the rim of the slots and the bending line approximately corresponds to the thickness of the sheet metal.

Additionally, a very rough punching edge is created when the slots are punched. The rough punching edge increases the danger of injury.

SUMMARY OF THE INVENTION

In accordance with the principles of the invention, a wiper yoke formed of a single metal strip has improved aerodynamic behavior without unfavorably affecting the rigidity of the yoke. The wiper yoke is producible in a relatively simple manner and meets safety requirements.

In accordance with the principles of the invention, a wiper yoke comprises a single metal strip provided with a plurality of slots. The metal strip is formed into a U-shaped cross-section such that lateral shanks or sidewalls are formed which are connected by a slotted web between the lateral shanks. The slots extend in width at least as far as the lateral shanks.

In one advantageous embodiment of the invention, the slots extend in width at least as far as the bending lines between the web and the lateral shanks.

Further in accordance with the invention, the edges of the slots are rounded.

BRIEF DESCRIPTION OF THE DRAWINGS

The invention may be better understood from a reading of the following detailed description in conjunction with the drawings in which like reference numerals designate like parts and in which:

FIG. 1 is a planar view of a sheet metal strip to be formed into a wiper yoke;

FIG. 2 is a section through the sheet metal strip of FIG. 1 in the area of a slot taken along lines II—II of FIG. 1;

FIG. 3 is a section through an embossing tool having inserted therein the sheet metal strip of FIG. 1;

FIG. 4 is a cross-section through a yoke formed from the strip of FIG. 1 in the area of a slot;

FIG. 5 is a perspective view of a yoke formed from the strip of FIG. 1; and

FIG. 6 is a cross-sectional view corresponding to FIG. 4 of another embodiment.

DETAILED DESCRIPTION OF THE DRAWINGS

The yoke as a whole designed by 10 has two lateral shanks 11 and 12 and a web 13 connecting these lateral shanks and is formed in one piece of the sheet metal strip 14 shown in FIG. 1 which is punched out of a plate not shown in detail. The bending lines B between the lateral shanks and the web are dotted in FIG. 1.

Several slots 20 are punched into the web 13, whereby the lateral rim 21 of the slots extends at a spacing laterally outside of the bending lines B. The spacing can approximately correspond to the thickness of the sheet metal strip. The spacing could be wider, but then the stability is diminished because the height H of the lateral shanks 11, 12 would be reduced in the area of the slots.

From the enlarged representation of FIG. 2, it can be seen that the punching edge at the lateral rim 21 of the slots is formed very unevenly and above all with sharp edges. In order to provide that no danger of injury originates from these sharp edges which are accessible from above when the lateral shanks 11, 12 are formed, the rim of the slots is rounded off. FIG. 3 shows a support 30 of an embossing tool on which the sheet metal strip 14 is rested. A stamp 31 rounds off the outside front edge 22 of the rim of the slot. When these roundings are only embossed by a stamp entering the slots, it has been found that due to deformation of material, a straight rim of the slot cannot be achieved. In the lateral view of the yoke, a kind of wave line was clearly seen. To overcome this disadvantage, which from a stylistic point of view is considerable, the outside of the sheet metal strip will be rounded off. This rounding is not necessary for safety, but to achieve a straight rim of the slot by uniform application of power on both front surfaces of the future lateral shanks. The lower front edge 15 of the lateral shanks 11, 12 is rounded off simultaneous with the rounding of the rim of the slots. The corresponding embossing radii are designated by R1 and R2. The embossing radius R1 is provided on grounds of safety and to achieve a straight and neat rim of the slot. Thus, the stamp 31 not only submerges between the slots 20, but also embraces the sheet metal strip 14 from the outside and thereby simultaneously serves as holding die so that the sheet metal strip cannot deflect laterally in the area of the slots.

It became obvious in tests that, when the length of the slots was too long, the edge of the slot was still uneven. A dependence between length of the slot and height of the lateral shanks in the area of the slots was recognized. Specifically, the length of each slot 20 must be less than 8 times the height H of the lateral shanks 11 or 12. Because the height of the lateral shanks increases from the end of a yoke towards the center, the length of the slots is varied accordingly.

From FIGS. 1 and 5, it can be seen that the length L of the slots varies and increases from the outside to the center of the yoke. The length of the slots is thereby proportional to the varying height H of the lateral shanks 11, 12. The web portions between the slots can also be of different length, whereby a particularly long slot is directly adjacent to the recess which is necessary for the jointed mounting of a wiper arm end.

The width of the yoke from the center to the end may be reduced in steps rather than continuously for styling reasons.

It is essential in this yoke that the width of the slots corresponds to the spacing of the lateral shanks and thus, as small a resistance surface as possible is exposed to the air stream. It is furthermore essential that the front edges of the lateral shanks in the area of the slots are rounded off above and outside as can be clearly seen from FIG. 4 so that the danger of injury is avoided.

Tests showed the roundings R1 can only be economically produced with the necessary accuracy when the roundings R2 are simultaneously embossed.

In a modified version according to FIG. 6, the main yoke 10 has an unsymmetrical slot 20 which in the web extends as far as to the one lateral shank and then continues in the lateral shank.

What is claimed is:

1. A method for manufacturing a windshield wiper yoke having a pair of lateral shanks and a connecting web and slots in said web extending in width into said lateral shanks for use in a wiper blade assembly, said method including the steps of:
   punching a blank from a single relatively thin sheet of metal, said blank being in the shape of a flattened yoke having a pair of lateral shanks and a connecting web;
   punching slots in said web, said slots extending in width into said lateral shanks;
   holding said blank in a die to prevent lateral deflection in the areas of said lateral shanks adjacent said slots while simultaneously stamping the edges of said slots adjacent said lateral shanks to round said edges; and
   bending said blank to form a U-shaped cross-section.

2. A method in accordance with claim 1 wherein a single stamping die used for said stamping step also acts as a holding die to prevent said lateral deflection during said stamping step.

3. A method in accordance with claim 1, wherein said stamping step also rounds the outside edge of said blank at the lower front edges of said lateral shanks.

* * * * *